US012769892B2

(12) United States Patent
Ma et al.

(10) Patent No.: US 12,769,892 B2
(45) Date of Patent: Oct. 20, 2026

(54) METHOD, ELECTRONIC DEVICE, AND COMPUTER PROGRAM PRODUCT FOR VERIFYING THAT CHASSIS IS OPENED

(71) Applicant: Dell Products L.P., Round Rock, TX (US)

(72) Inventors: Xin Zhi Ma, Shanghai (CN); Kongxian Nie, Shenzhen (CN)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 18/785,720

(22) Filed: Jul. 26, 2024

(65) Prior Publication Data

US 2026/0004008 A1 Jan. 1, 2026

(30) Foreign Application Priority Data

Jun. 28, 2024 (CN) ......................... 202410865098.0

(51) Int. Cl.
*G06F 21/86* (2013.01)
*G06F 21/81* (2013.01)
(Continued)

(52) U.S. Cl.
CPC .............. *G06F 21/86* (2013.01); *G06F 21/81* (2013.01); *G06F 1/181* (2013.01); *G06F 21/88* (2013.01)

(58) Field of Classification Search
CPC .......... G06F 21/86; G06F 1/181; G06F 21/81; G06F 21/78; G06F 21/70; G06F 2221/034
See application file for complete search history.

(56) References Cited

U.S. PATENT DOCUMENTS 10,552,646 B2 * 2/2020 Subramanian .......... G06F 21/86
12,500,147 B2 * 12/2025 Shatit ........................ G06F 1/14
(Continued)

FOREIGN PATENT DOCUMENTS

CN 114660356 A * 6/2022 ........... G01R 22/066

OTHER PUBLICATIONS

Smartt, Heidi A., and Zoe Nellie Gastelum. "Tamper-Indicating Enclosures a Current Survey." Obtained from <https://www.osti.gov/servlets/purl/1256541>, retrieved on Dec. 27, 2025. (Year: 2015).*

(Continued)

*Primary Examiner* — Zhimei Zhu
(74) *Attorney, Agent, or Firm* — Ryan, Mason & Lewis, LLP

(57) ABSTRACT

Embodiments of the present disclosure relate to a method, electronic device, and computer program product for verifying that a chassis is opened. In the method, the chassis is communicatively connected with a controller of a motherboard, and the method includes sending first verification information to the chassis. The method further includes determining that the chassis is opened in response to not receiving second verification information sent by the chassis; or determining that the chassis is opened in response to the received second verification information sent by the chassis being different from the first verification information. Through the method of the present disclosure, the dynamic adaptability and reliability of intrusion detection can be improved, and a more flexible and extensive detection range is added. Furthermore, the addition of the verification information can also prevent users from bypassing intrusion detection means through simple replacement or cloning.

20 Claims, 10 Drawing Sheets

(51) Int. Cl.
*G06F 1/18* (2006.01)
*G06F 21/88* (2013.01)

(56) References Cited

U.S. PATENT DOCUMENTS

| | | | | |
|---|---|---|---|---|
| 2008/0091605 | A1* | 4/2008 | Hughes | G06Q 30/0185 705/51 |
| 2010/0180122 | A1* | 7/2010 | Coussieu | G06Q 20/341 713/176 |
| 2015/0022969 | A1* | 1/2015 | Yin | G06F 21/86 361/679.57 |
| 2020/0176044 | A1* | 6/2020 | Lees | G06F 12/1491 |
| 2023/0244784 | A1* | 8/2023 | Rodriguez | G06F 21/75 726/34 |
| 2024/0111912 | A1* | 4/2024 | Wesneski | G06F 21/86 |

OTHER PUBLICATIONS

Lu, M.-C .; Huang, Q.-X.; Chiu, M.-Y.; Tsai, Y.-C.; Sun, H.-M. PSPS: A Step toward Tamper Resistance against Physical Computer Intrusion. Sensors 2022, 22, 1882. (Year: 2022).*

T. Brey et al., "BladeCenter Chassis Management," IBM Journal of Research and Development, vol. 49, No. 6, Nov. 2005, pp. 941-961.

* cited by examiner

METHOD, ELECTRONIC DEVICE, AND COMPUTER PROGRAM PRODUCT FOR VERIFYING THAT CHASSIS IS OPENED

RELATED APPLICATION

The present application claims priority to Chinese Patent Application No. 202410865098.0, filed Jun. 28, 2024, and entitled "Method, Electronic Device, and Computer Program Product for Verifying that Chassis is Opened," which is incorporated by reference herein in its entirety.

FIELD

Embodiments of the present disclosure relate to the technical field of computers, and more specifically, to a method, electronic device, and computer program product for verifying that a chassis is opened.

BACKGROUND

With the continuous development of computer technologies, devices (such as servers, workstations, and the like) containing a great amount of critical business data and personal privacy information are widely deployed in public places and enterprises. Individuals or enterprises have more and more important data stored in the devices or use the devices to manage or run data or files. The chassis of the devices can protect various components inside the devices, such as the motherboard, hard disk, power supply, and the like. Many components of the devices, such as the motherboard and hard disk, contain a great amount of computer data.

SUMMARY

Embodiments of the present disclosure relate to a method, electronic device, and computer program product for verifying that a chassis is opened.

According to a first aspect of the present disclosure, a method for verifying that a chassis is opened is provided. In the method, the chassis is communicatively connected with a controller of a motherboard, and the method includes sending first verification information to the chassis. The method further includes determining that the chassis is opened in response to not receiving second verification information sent by the chassis; or determining that the chassis is opened in response to the received second verification information sent by the chassis being different from the first verification information.

According to a second aspect of the present disclosure, an electronic device for verifying that a chassis is opened is provided. The electronic device includes a chassis and a motherboard, a controller of the motherboard being communicatively connected with the chassis; and a memory coupled to the controller of the motherboard and having instructions stored therein, where the instructions, when executed by the controller of the motherboard, cause the electronic device to perform actions comprising: sending first verification information to the chassis; and determining that the chassis is opened in response to not receiving second verification information sent by the chassis within a preset time period; or determining that the chassis is opened in response to the received second verification information sent by the chassis being different from the first verification information.

According to a third aspect of the present disclosure, a computer program product is provided. The computer program product is tangibly stored on a non-transitory computer-readable storage medium and comprises machine-executable instructions. The machine-executable instructions, when executed by a machine, cause the machine to perform actions comprising: sending first verification information to the chassis; and determining that the chassis is opened in response to not receiving second verification information sent by the chassis within a preset time period; or determining that the chassis is opened in response to the received second verification information sent by the chassis being different from the first verification information.

BRIEF DESCRIPTION OF THE DRAWINGS

The above and other objectives, features, and advantages of the present disclosure will become more apparent from the following Detailed Description of example embodiments of the present disclosure, with reference to the drawings, where in the example embodiments of the present disclosure, the same reference numerals generally represent the same elements.

DETAILED DESCRIPTION

Embodiments of the present disclosure will be described below in further detail with reference to the drawings. Although the drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included herein.

As mentioned above, if the chassis is opened, the motherboard, hard disk, and the like protected by the chassis may all be intruded. For example, if unauthorized internal information intrudes into the motherboard or hard disk, private information of a user or business data of an enterprise may be stolen. This brings losses in security or other aspects to users.

In the related art, a microswitch can be installed on the chassis side to detect whether the chassis is opened or to monitor the state change when the chassis is opened. However, the switch can be tampered with by some simple means to avoid detection when the chassis is opened, thus completely preventing the detected risk of stealing the information stored in the device.

To this end, an embodiment of the present disclosure provides a method for verifying that a chassis is opened, where the chassis is communicatively connected with a controller of a motherboard. The method includes sending verification information to the chassis, and determining that the chassis is opened in response to not receiving the verification information sent by the chassis or in response to the received verification information sent by the chassis being different from the sent verification information. In this way, the physical limitations of conventional intrusion detection solutions can be broken, and different malicious intrusion means can be comprehensively detected, thus improving the dynamic adaptability and reliability of intrusion detection and adding a more flexible and extensive detection range. Furthermore, the addition of the verification information can also prevent users from bypassing intrusion detection means through simple replacement or cloning.

Figure 1:
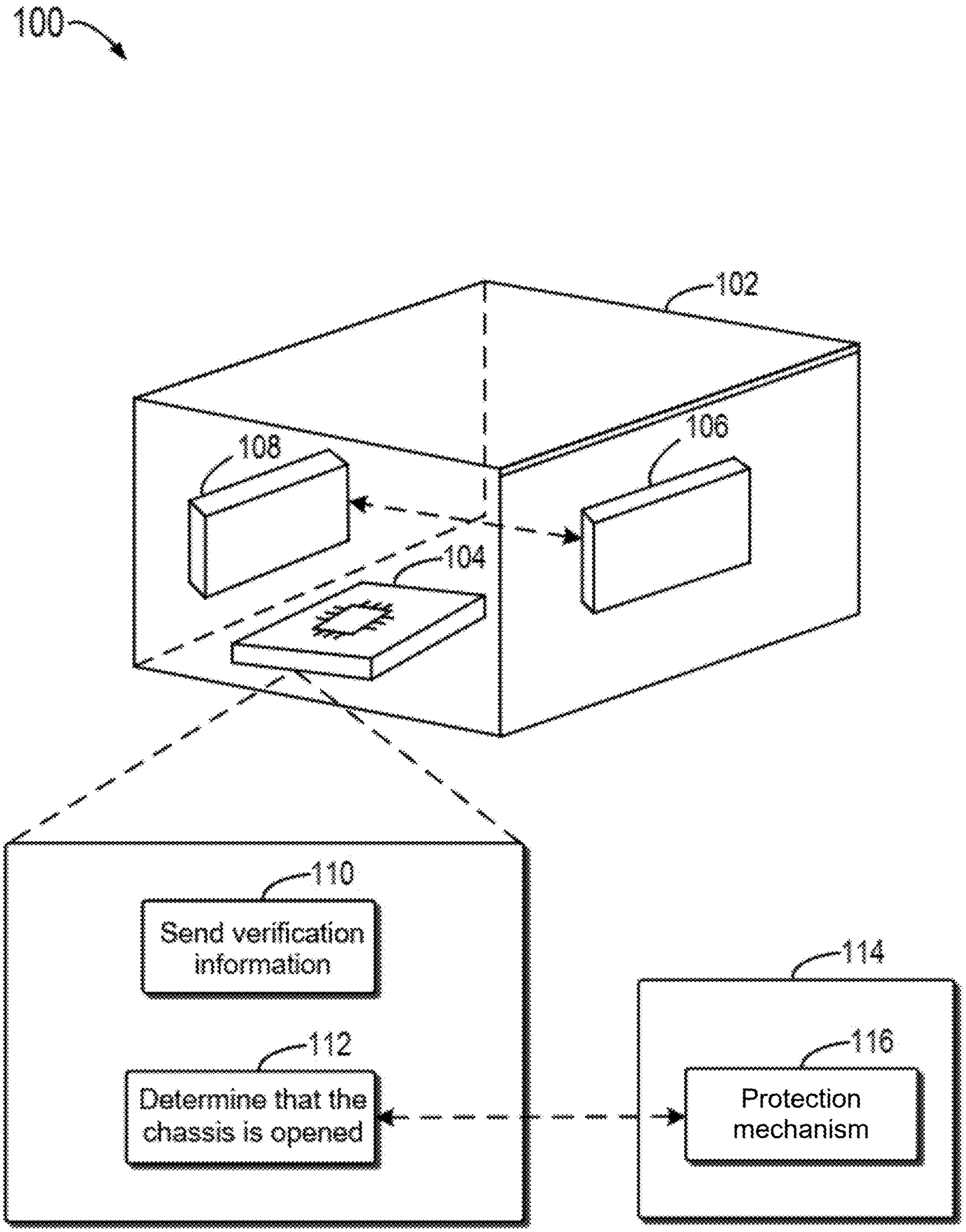
FIG. 1 is a schematic diagram of a first example environment in which a plurality of embodiments of the present disclosure can be implemented.

Basic principles and several example embodiments of the present disclosure will be described in detail below with reference to the drawings. FIG. 1 is a schematic diagram of an example environment 100 in which a plurality of embodiments of the present disclosure can be implemented. As shown in FIG. 1, the example environment 100 includes a chassis 102, a motherboard 104, a first wireless communication module 106 arranged on the chassis 102, and a second wireless communication module 108 arranged on the motherboard 104. It should be understood that the numbers and arrangements of components, elements, and systems illustrated in FIG. 1 are examples only, and the architectural diagram may include different numbers and different arrangements of the components, elements, and systems. The chassis 102 is the housing of an electronic device to accommodate and protect internal electronic components (e.g., the motherboard 104). The chassis 102 can provide the necessary supporting structure for the internal components, and can also protect the internal components from intrusion.

In some embodiments of the present disclosure, the motherboard 104 is installed in the chassis 102 of the electronic device and is a core component in the electronic device. The motherboard 104 may be a rectangular circuit board, on which the essential circuit systems of the electronic device are installed, usually including a Basic Input/Output System (BIOS) chip, an Input/Output (I/O) control chip, a keyboard and panel control switch interface, an indicator light connector, an expansion slot, a DC power supply connector for the motherboard and add-in cards, and other elements. It should be noted that the motherboard 104 here not only includes the motherboard in the conventional sense, but also includes a secondary board or other components arranged in the chassis. In other words, the second wireless communication module 108 may also be arranged on the secondary board or at other positions in the chassis.

It can be understood that since the motherboard 104 is installed in the chassis 102, if the chassis 102 is opened without authorization, the data corresponding to the motherboard 104 or other electronic components therein is very likely to be maliciously stolen or tampered with. Therefore, it can be determined whether the electronic device is intruded by detecting whether the chassis 102 is opened.

In this example environment, communications between the chassis 102 and the motherboard 104 pass through the first wireless communication module 106 and the second wireless communication module 108. The first wireless communication module 106 and the second wireless communication module 108 are modules for realizing wireless communication functions that can receive and transmit wireless signals. The first wireless communication module 106 and the second wireless communication module 108 can transmit data by using radio waves, which may be an invisible communication mode, such as High-Fidelity Wireless Communication (Wi-Fi) connection, Infrared Communication (IRC), 4th Generation Mobile Communication Technology (4G), Bluetooth, radar, satellite, and the like. In some embodiments of the present disclosure, the first wireless communication module 106 may be a short-range wireless communication module. The short-range wireless communication module may be a communication module based on some short-range communication technology. For example, it may be a communication module based on Bluetooth technology, a communication module based on infrared technology, or the like.

In some embodiments of the present disclosure, a controller (not shown in FIG. 1) of the motherboard 104 can determine whether the chassis 102 is opened based on whether the chassis 102 can normally receive and return verification information. The controller of the motherboard 104 may be a controller separately arranged on the motherboard 104, or may be integrated into the management controller of the motherboard 104. The management controller may include, but is not limited to, a Baseboard Management Controller (BMC), a Basic Input/Output System (BIOS), or the like.

At block 110, the controller of the motherboard 104 can generate verification information. The controller can generate the verification information continuously or periodically. The verification information is used to verify whether the chassis 102 is opened. The verification information may include identification information, a model of the chassis, a time stamp, and the like. In some embodiments of the present disclosure, in order to increase the reliability and security of the verification information, the verification information may also include encrypted information or a check code, such as a 16-bit password generated by using an encryption algorithm. After generating the verification information, the controller can send it to the first wireless communication module 106 arranged on the chassis through the second wireless communication module 108.

At block 112, the controller can determine whether the chassis is opened based on whether the verification information returned by the chassis is received or whether the received verification information is the same as the generated verification information. For example, after sending the verification information to the chassis, if no verification information returned by the chassis is received, it indicates that the chassis is opened; and if the verification information returned by the chassis is different from the verification information sent to the chassis, it indicates that the chassis is opened.

It can be understood that in order to protect the device or system from further intrusion when it is determined that the chassis is opened and to avoid greater losses to users, the controller of the motherboard can trigger a response when it is determined that the chassis is opened and send an instruction to management software 114 through a network. After receiving the instruction, the management software 114 can analyze the intrusion event and execute a corresponding preset protection mechanism 116, such as generating an alarm, powering off the system, and the like. The management software 114 can be independently and autonomously managed locally or can be uniformly deployed and managed through a remote network.

In this way, by combining the response of the motherboard controller, network communication, and the analysis and processing capabilities of the management software, an efficient and secure intrusion detection system can be constructed, and the safety of the device and system can be effectively protected by using various protection mechanisms.

Figure 2:
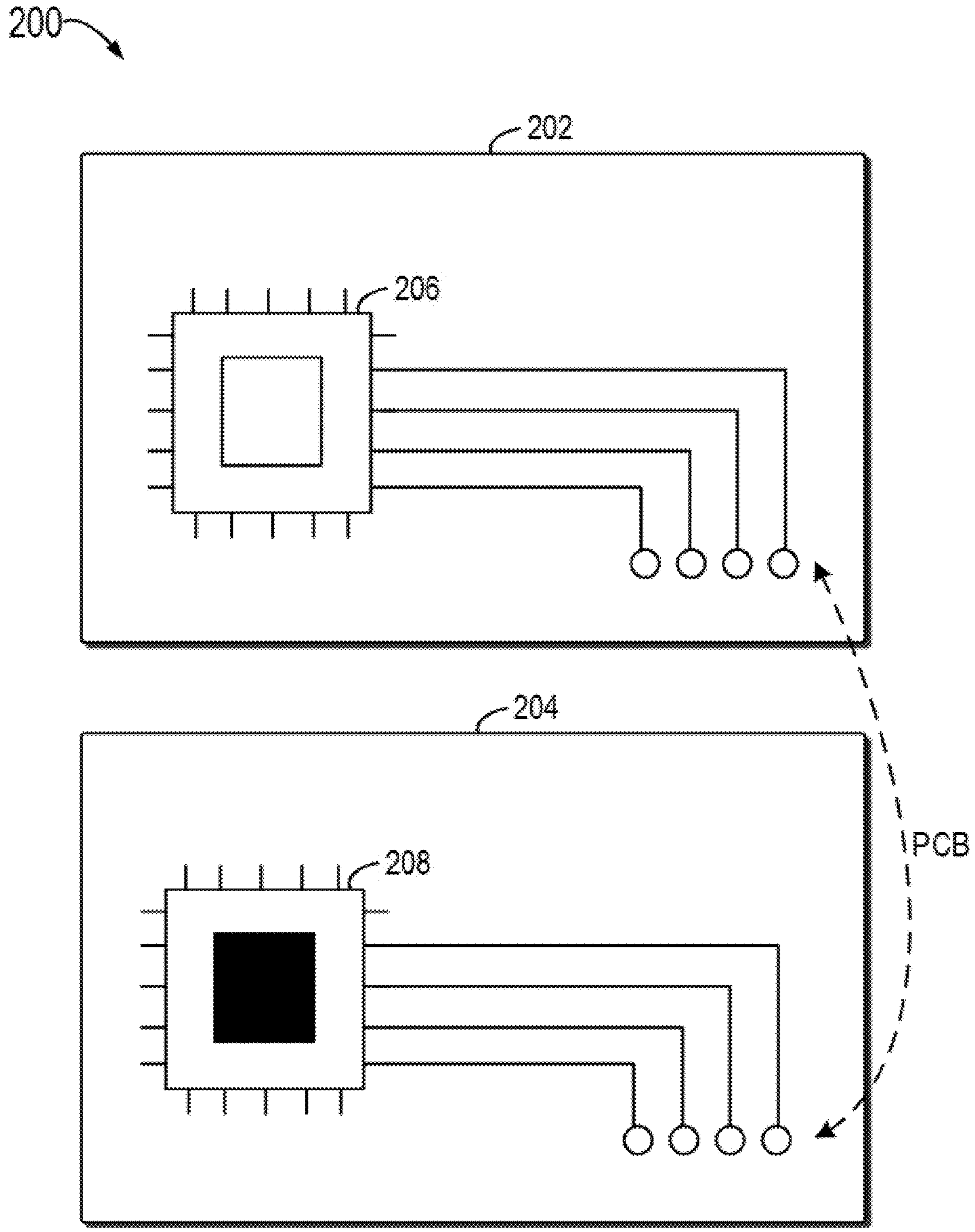
FIG. 2 is a schematic diagram of a second example environment in which a plurality of embodiments of the present disclosure can be implemented.

FIG. 2 is a second schematic diagram of an example environment 200 in which some embodiments of the present disclosure can be implemented. As shown in FIG. 2, the example environment 200 includes a chassis 202, a motherboard 204, a controller 208 of the motherboard 204, and a storage module 206 arranged on the chassis 202. The storage module 206 is wired to the controller 208 of the motherboard 204. For example, the storage module 206 may be connected to the controller 208 via a communication bus or a connector. The communication bus may include a Peripheral Component Interconnect (PCI) bus, a Serial Peripheral Interface (SPI), and the like. It should be understood that the numbers and arrangements of components, elements, and systems illustrated in FIG. 2 are examples only, and the architectural diagram may include different numbers and different arrangements of the components, elements, and systems.

In some embodiments of the present disclosure, the controller 208 can generate verification information and send the verification information to the storage module 206 via the communication path between the controller 208 and the storage module 206. The storage module 206 can store the received verification information. In some embodiments, if the controller 208 detects that the communication path between the two is broken, it indicates that the chassis is opened, and the controller 208 can trigger an alarm and trigger a protection mechanism.

In some other embodiments, the controller 208 can read the information stored in the storage module 206 in real time or periodically (e.g., every 20 seconds) via the communication path between the two. If the information read by the controller 208 is different from the expected verification information, it indicates that the chassis is opened, and the controller 208 can trigger an alarm and trigger a protection mechanism. It can be understood that the verification information may be dynamically changing verification information. The controller 208 can update the verification information based on a preset period and update the verification information stored in the storage module.

In this way, since the storage module has low cost and low installation cost, a chassis intrusion detection function with high security and reliability can be provided for users without increasing too much cost.

Figure 3:
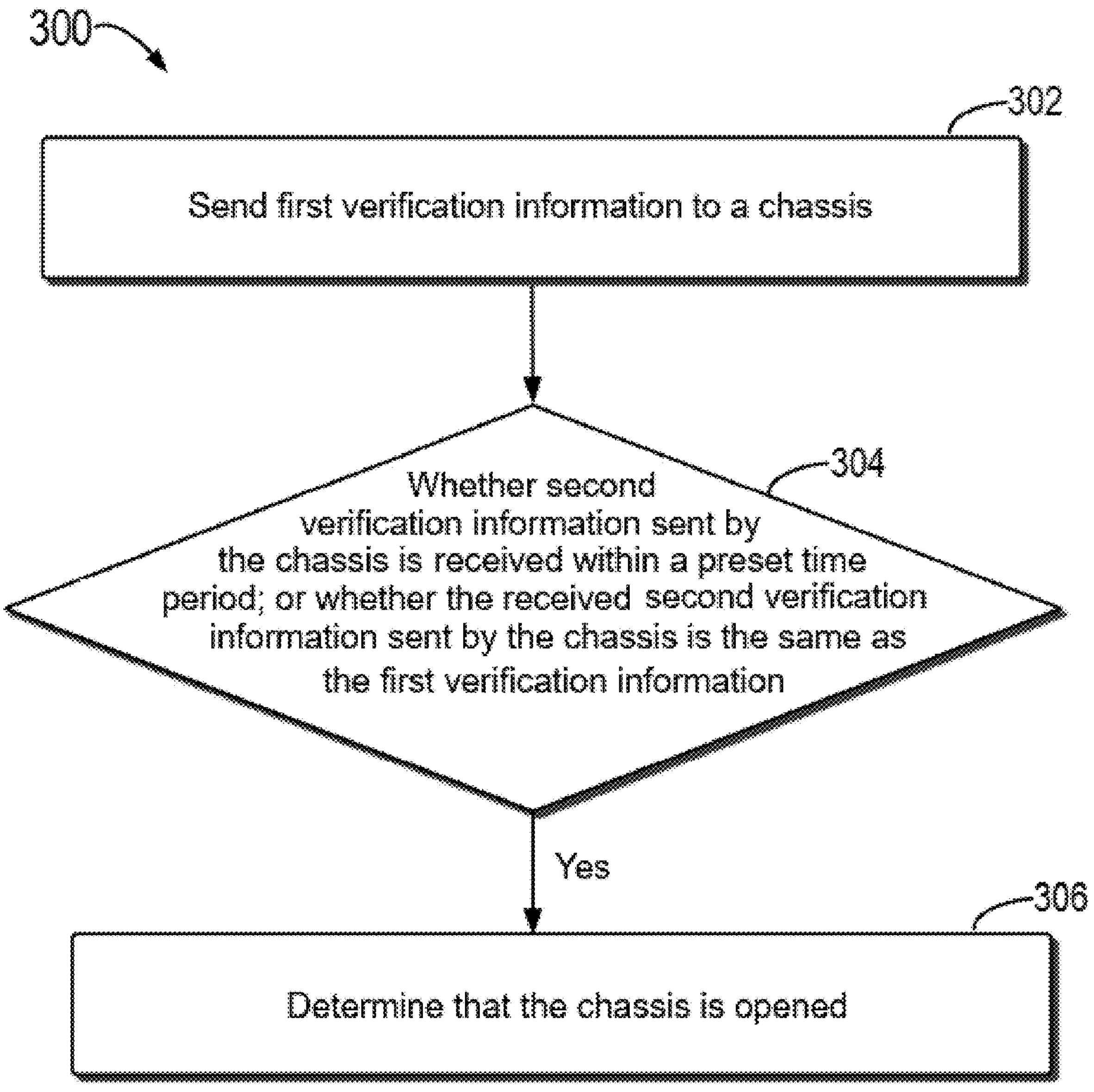
FIG. 3 is a flow chart of a method for verifying that a chassis is opened according to an embodiment of the present disclosure.

FIG. 3 is a flow chart of a method 300 for verifying that a chassis is opened according to some embodiments of the present disclosure. The method 300 may be performed by the controller in FIG. 1 or the controller 208 in FIG. 2.

As shown in FIG. 3, at block 302, the method 300 includes sending first verification information to the chassis, such as the chassis 102 shown in FIG. 1. It can be understood that the chassis is communicatively connected with a controller of a motherboard, such as the motherboard 104 shown in FIG. 1. The communicative connection may be made in a wireless manner or a wired manner. For example, the chassis can be communicatively connected with the controller of the motherboard through a wireless communication module. The chassis can also be wired to the controller of the motherboard through a storage module.

In some embodiments of the present disclosure, the storage module or the wireless communication module may be arranged on the chassis (e.g., on the chassis cover or the chassis side panel). The controller of the motherboard can generate verification information and send the verification information to the chassis via the communication path. When the chassis is in the closed state, the communication state between the chassis and the motherboard will be in the communicating state where the motherboard can send the verification information to the chassis. When the chassis (e.g., the chassis cover) is in the opened state, since the mode of wireless communication between the chassis and the motherboard generally has an effective distance or the bus between the chassis and the motherboard may be cut off, the communication state between the chassis and the motherboard will be in the disconnected state, whereby the motherboard cannot send the verification information to the chassis, and the chassis cannot receive the corresponding verification information normally.

At block 304, the method 300 includes determining whether the second verification information sent by the chassis is received within a preset time period or whether the received second verification information sent by the chassis is the same as the first verification information. It can be understood that if the communicative connection between the chassis and the motherboard is broken, the motherboard or the chassis cannot normally receive the verification information sent by each other. Based on this, it can be determined whether the chassis is opened based on whether the verification information sent by the chassis is received. If no verification information sent by the chassis is received within the preset time period, it can be determined that the chassis is opened and the device may have been intruded.

In some embodiments of the present disclosure, the controller may send dynamic verification information to the chassis in real time or periodically. If the chassis is opened for a short period of time and then closed again (the communicative connection state between the chassis and the motherboard is disconnected for a short period of time and then reconnected), the verification information sent by the controller to the chassis within the short period of time when the chassis is opened will not be received by the chassis. In this situation, after communication is resumed between the chassis and the motherboard, the verification information returned by the chassis is still the verification information at the previous instant that is received before the chassis is opened, so the verification information returned by the chassis will be different from that sent by the motherboard.

Alternatively, if a user maliciously cracks the intrusion detection program provided in the chassis, the chassis may send wrong verification information to the motherboard under the interference from the malicious user, so that the verification information returned by the chassis will also be different from that sent by the motherboard. Based on the two situations above, the result of comparison between the verification information returned by the chassis and that sent by the motherboard can also reflect whether the chassis is opened.

At block 306, the method 300 includes determining that the chassis is opened in response to not receiving the second verification information sent by the chassis within a preset time period, or determining that the chassis is opened in response to the received second verification information sent by the chassis being different from the first verification information sent by the controller. For example, in the case where the verification information returned by the chassis is different from that sent by the motherboard, it is determined that the chassis is opened. In other embodiments of the present disclosure, the controller of the motherboard can also determine whether the chassis is opened through the communication state between the chassis and the motherboard. For example, it can be determined that the chassis is opened when it is monitored that the communication state is disconnected.

In this way, through intrusion detection for the chassis based on the communication mechanism between the chassis and the motherboard and the verification information, the physical limitations of the conventional microswitch solution can be broken, and different malicious intrusion means can be comprehensively detected, thus improving the dynamic adaptability and reliability of intrusion detection and adding a more flexible and extensive detection range. Furthermore, the addition of verification information can prevent users from bypassing the intrusion detection means by simple replacement or cloning.

In some embodiments of the present disclosure, the verification information may be static information or dynamic information. The verification information may include any one or more of character strings, letters, numbers, Chinese characters, and symbols. It can be understood that in the case where the verification information is dynamic information, the dynamic information can change with different situations or different verification requirements. In some embodiments, the verification information can be determined based on the current time of the device. For example, the verification information can be generated based on the current instant of the device. In some embodiments of the present disclosure, the verification information can also be generated by generating a random number.

It can be understood that the verification information can include two types of information, one is fixed information (e.g., the serial number of the chassis, the identification information of the motherboard, and the like), and the other is changing information (e.g., a time stamp, a random number, or a password generated according to a preset encoding method). In some embodiments of the present disclosure, in order to improve the confidentiality of the verification information and prevent the verification information from being easily cracked, the verification information or part of the verification information can be encrypted by an encryption algorithm. The encryption algorithm may include, for example, Message Digest Algorithm 5th Edition (MD5), Secure Hash Algorithm (SHA), and the like. In an example, the verification information may be service tag+temporal information+password, and the temporal information may include some or all of year, month, day, hour, minute, and second. For example, the verification information may be service tag (2W17QM1)+temporal information (2024-2-17 19:04)+password (IamRoot@ #&*20629).

In some embodiments of the present disclosure, in order to ensure the security of the system and avoid unauthorized access and to prevent users from easily bypassing the intrusion detection, various strategies can be adopted to enhance the complexity and reliability of the verification information. For example, dynamically changing verification information can be used, and the reliability of the verification information can also be enhanced by means of cross-verification. In some embodiments of the present disclosure, the controller of the motherboard can generate the verification information based on the time stamp of the device or other random factors. In other words, the verification information generated by the controller each time it verifies whether the chassis is opened is different and thus difficult to be copied or predicted, so that it is difficult for users to find the generation rule of the verification information through multiple pieces of verification information, thus preventing users from easily bypassing the intrusion detection means.

In some embodiments of the present disclosure, in cross verification, the chassis and the controller of the motherboard can each generate verification information to verify whether the other party can normally receive or return the verification information. In other embodiments of the present disclosure, in order to improve the accuracy and reliability of verification, the verification information can also be transmitted by means of frequency hopping. Frequency hopping is a commonly used technology in communication, which can prevent signals from being intercepted or interfered by switching among a plurality of frequencies quickly. Scrolling the verification information between the chassis and the motherboard can prevent the verification information from being tampered with or intercepted during transmission, thus ensuring the security and reliability of the verification process.

In some embodiments of the present disclosure, the motherboard can continuously generate the verification information to continuously verify whether the chassis is opened. Through such continuous generation of the verification information, the state of the chassis can be monitored in real time, so that once the chassis is opened, this event can be detected immediately. This method is very effective in situations with extremely demanding security requirements, and can ensure that any unauthorized access can be quickly identified.

In other embodiments of the present disclosure, in order to save verification resources and system resources while ensuring the verification efficiency and accuracy, the verification information can be generated at preset time intervals. For example, the controller of the motherboard can generate the verification information every 10 seconds to verify whether the chassis is opened. In some embodiments of the present disclosure, in order to ensure the reliability and fairness of intrusion detection, a trust duration can be set. The trust duration can be set by the user. If no verification information returned by the chassis or motherboard is received within the trust duration, it indicates that the chassis is opened. This mechanism can effectively prevent malicious attackers from bypassing the intrusion detection by interfering with the transmission of the verification information. It can be understood that the trust duration can be determined based on the protection requirements of the device or motherboard. For example, in the case where the data in the motherboard is of high importance and has demanding confidentiality requirement, the trust duration can be set to a short duration (e.g., 2 s).

In this way, the reliability and security of the intrusion detection can be continuously increased through various approaches and methods to construct an intrusion detection system that is both efficient and secure.

In some embodiments of the present disclosure, the mode of communicative connection between the chassis and the motherboard (the controller of the motherboard) may be wired connection or wireless connection. In the case where the mode of communicative connection between the chassis and the motherboard is wireless connection, the chassis (e.g., the chassis 102 shown in FIG. 1) can establish wireless communicative connection between the chassis and the motherboard through a wireless communication module (e.g., the first wireless communication module 106 shown in FIG. 1) arranged on the chassis and a wireless communication module (e.g., the second wireless communication module 108 shown in FIG. 1) arranged on the motherboard (e.g., the motherboard 104 shown in FIG. 1). The wireless communication module arranged on the chassis may be a wireless communication chip. The wireless communication chip is an integrated circuit chip that can transmit data in a wireless manner and supports various wireless communication standards. The wireless communication standards may include, but are not limited to, Wi-Fi connection, IRC connection, Near-field Communication (NFC) connection, Bluetooth connection, Wireless Local Area Network (WLAN) connection, and other short-range connection modes for communication. In some embodiments of the present disclosure, in order to save cost, the connection between the chassis and the motherboard may be made in the NFC connection mode.

It can be understood that the mode of wireless communicative connection generally has the limitation of effective distance, and beyond a certain distance, the communicative connection between the chassis and the motherboard will be broken. For example, the effective distance of the NFC connection mode is typically 1-4 cm, within which stable data transmission (e.g., sending or receiving verification information) can be carried out between the motherboard and chassis. Once the effective distance is exceeded, the NFC connection between the chassis and the motherboard will be broken, so the motherboard or the chassis is incapable of normal transmission of the verification information.

In some embodiments of the present disclosure, the wireless communication module arranged on the chassis or the wireless communication module arranged on the motherboard can generate corresponding verification information according to the user settings. For example, the verification information may include, but is not limited to, a serial number of the chassis, time stamp, and password. The serial number of the chassis may also be the serial number of the corresponding electronic device. The time stamp refers to the instant when the current verification information is generated, for example, "2024.06.18.13."

In some embodiments of the present disclosure, in order to increase the difficulty of chassis intrusion and prevent users from maliciously tampering with the verification information, the verification information can be encrypted by using an encryption technology to generate encrypted verification information. The wireless communication module on the chassis can encrypt the information set by the user by means of symmetric encryption algorithm, asymmetric encryption algorithm, and block encryption algorithm to generate the verification information. For example, the information can be encrypted by using the Advanced Encryption Standard (AES) algorithm.

In some embodiments of the present disclosure, the wireless communication module on the chassis may also be used to store the received verification information. For example, the wireless communication module arranged on the chassis may be an NFC chip. NFC chips are installed at multiple positions of the chassis to ensure that no matter at which position the chassis is opened, the controller of the motherboard can detect this. Accordingly, the wireless communication module arranged on the motherboard may be an NFC read-write module, which communicates with the NFC chip on the chassis in real time. It can be understood that the NFC read-write module is connected with the controller of the motherboard. In some embodiments of the present disclosure, the NFC read-write module can generate verification information, and automatically establish a communication session with the NFC chip every 5 seconds to send the verification information to the NFC chip to verify whether the chassis is opened.

The term verification here refers to whether the NFC chip can be read or whether the verification information read from the NFC chip is the same as the verification information that has been sent. The NFC chip has a rewritable memory which can store dynamically changing verification information. If the read verification information is the same as expected (e.g., the time stamp is valid, i.e., the time stamp is within the preset time window, and the random password is the same as the known password sequence), it indicates that the chassis is not opened and the chassis is in a normal closed state. At this time, the NFC read-write module can generate new verification information and write the verification information into the NFC chip.

By regularly updating the verification information, it can be ensured that even if someone tries to read or copy the old verification information, such information will be invalidated in a short period of time. After writing the new verification information into the NFC chip, the NFC read-write module will read such information again and perform cross-verification. The purpose of this step is to ensure that the new verification information has been correctly written into the NFC chip, and that no write failure is caused by some unexpected factors (e.g., hardware failure or interference).

In some embodiments of the present disclosure, in order to improve the security and accuracy of verification, both the NFC chip and the NFC read-write module can generate and verify information in real time to prevent fraud. For example, the verification information generated by the NFC chip can be sent to the NFC read-write module, and the verification information generated by the NFC read-write module can be received as well. Of course, the verification information generated by the NFC read-write module can also be sent to the NFC chip, and the verification information generated by the NFC chip can be received as well. In some embodiments of the present disclosure, if the NFC chip or NFC read-write module verifies that the communication state between them is disconnected or the verification information sent is different from that received for 10 consecutive seconds, it indicates that the chassis is opened and the device is intruded. The NFC read-write module can send intrusion alarm information to the controller of the motherboard, such as a BMC controller, thus triggering a preset alarm and action.

In some embodiments of the present disclosure, the management software of the device can establish a plurality of preset protection mechanisms in advance. The preset protection mechanisms can include a plurality of protection levels, and different protection levels correspond to different protection actions. For example, in the case where the preset protection mechanism is of a low protection level, the protection action included in the preset protection mechanism is to display exception information on the display screen of the device or to make the controller indicator light be always on to warn the user. In other embodiments of the present disclosure, the preset protection mechanism may also be to record this verification result and verification situation as log content. In the case where the preset protection mechanism is of a medium protection level, the protection action included in the preset protection mechanism may be to control the indicator light to blink or to control the sound device to emit an alarm sound to warn the user. In the case where the preset protection mechanism is of a high protection level, the protection action included in the preset protection mechanism may be to power off the system.

In some embodiments of the present disclosure, the preset protection mechanism to be executed can be determined based on the type of chassis intrusion. For example, the type of chassis intrusion can be determined based on the situation of chassis intrusion and the logging. Based on the type of chassis intrusion, the risk level of chassis intrusion is determined. The risk level may be a specific level value (e.g., the risk value is 60 with the range of risk value being 0-100) or a level category (e.g., low level, medium level, and high level). Based on the risk level of chassis intrusion, the corresponding preset protection mechanism is determined. For example, in the case where the risk level of the chassis intrusion is high, the system can be powered off and a sound can be emitted to alert the user.

In some embodiments of the present disclosure, the chassis and the motherboard can also be communicatively connected through a technology of Radio Frequency Identification (RFID) that supports both low-frequency and ultra-high-frequency bands. For example, the communication channel between the chassis and the motherboard can be established through the RFID tag arranged on the chassis and the RFID reader-writer arranged on the motherboard or the secondary board. A plurality of RFID tags can be installed at different positions of the chassis. As can be understood, by installing low-frequency and ultra-high-frequency RFID tags at different positions of the chassis, it can be ensured that the system can detect exceptions no matter which RFID reading device the intruder uses. Different RFID tags can be provided by different suppliers. For example, supplier A provides low-frequency RFID tags, and supplier B provides ultra-high-frequency RFID tags.

In some embodiments of the present disclosure, the RFID reader-writer can encrypt the chassis information using an encryption algorithm (e.g., block cipher algorithm) to generate the verification information (e.g., generate a 192-bit key). The RFID reader-writer can communicate with the controller of the motherboard. For example, the communication protocol between the RFID reader-writer and the controller (e.g., BMC) of the motherboard may be an Intelligent Platform Management Interface (IPMI) communication protocol. The verification information can be sent to the controller of the motherboard via the communication path between the RFID chip and the controller of the motherboard.

In some embodiments of the present disclosure, the mode of communication between the chassis and the motherboard may also be wired communication. For example, a storage module (e.g., the storage module 206 shown in FIG. 2) can be deployed on the chassis, and the storage module is connected with the controller of the motherboard via a cable (e.g., a printed circuit board (PCB) cable as shown in FIG. 2) for receiving the verification information sent by the controller of the motherboard, and it can be ensured that the controller of the motherboard can read the verification information stored in the storage module under the condition of communicative connection between the chassis and the motherboard. In some embodiments of the present disclosure, the storage module can be arranged on the chassis cover to prevent users from easily finding it and easily avoiding detection of the intrusion. It can be understood that the storage module can be connected with the circuit on the motherboard through electrical contacts or connectors.

In some embodiments of the present disclosure, by connecting the storage module with the circuit of the motherboard via the bus, it can be ensured that the storage module can receive power supply from the motherboard, thus keeping the storage module in an active state. In addition, the motherboard can also be enabled to enable the logic circuits or management modules (e.g., a management chip, logic control chip, Complex Programmable Logic Device (CPLD), or BMC) on the motherboard to access the storage module to perform reading and writing operations (e.g., reading the verification information stored in the storage module). The reading and writing operations include reading the verification information from the storage module, verifying its integrity, and updating or modifying the information stored in the storage module.

In some embodiments of the present disclosure, the storage module arranged on the chassis may be a 64-bit Electrically Erasable Programmable Read Only Memory (EEPROM) chip. The EEPROM chip and its corresponding peripheral circuits are arranged at different positions of the chassis according to the actual detection requirements. For example, the EEPROM chip can be installed at the position of the side panel of the chassis. When the chassis is in a normal state, that is, it is not opened, the EEPROM chip can be connected with the controller of the motherboard, such as the CPLD circuit on the motherboard, through a connector (e.g., a 4-pin spring pin connector).

In some embodiments of the present disclosure, the verification information sent to the EEPROM chip may include the serial number of the chassis and a dynamic password generated according to a preset encoding method. In other words, the EEPROM chip stores the serial number of the motherboard (e.g., a 32-bit SHA-256 hash value) and a dynamic password. It can be understood that the verification information can be generated by the CPLD of the motherboard, such as a Linear Feedback Shift Register (LFSR) that can be embedded in the CPLD of the motherboard, to generate a 16-bit pseudo-random code (dynamic password). After generating the verification information, the CPLD can read the information stored in the EEPROM chip continuously or at preset time intervals (e.g., every 20 s). If the information read is different from the verification information sent, it indicates that the EEPROM chip on the chassis is disconnected from the CPLD and the chassis is opened.

In this way, since the memory chip has a low cost, a low-cost chassis intrusion detection mechanism can be provided, which can prevent, to a certain extent, users from maliciously accessing without authorization or tampering with the information of the device.

Figure 4:
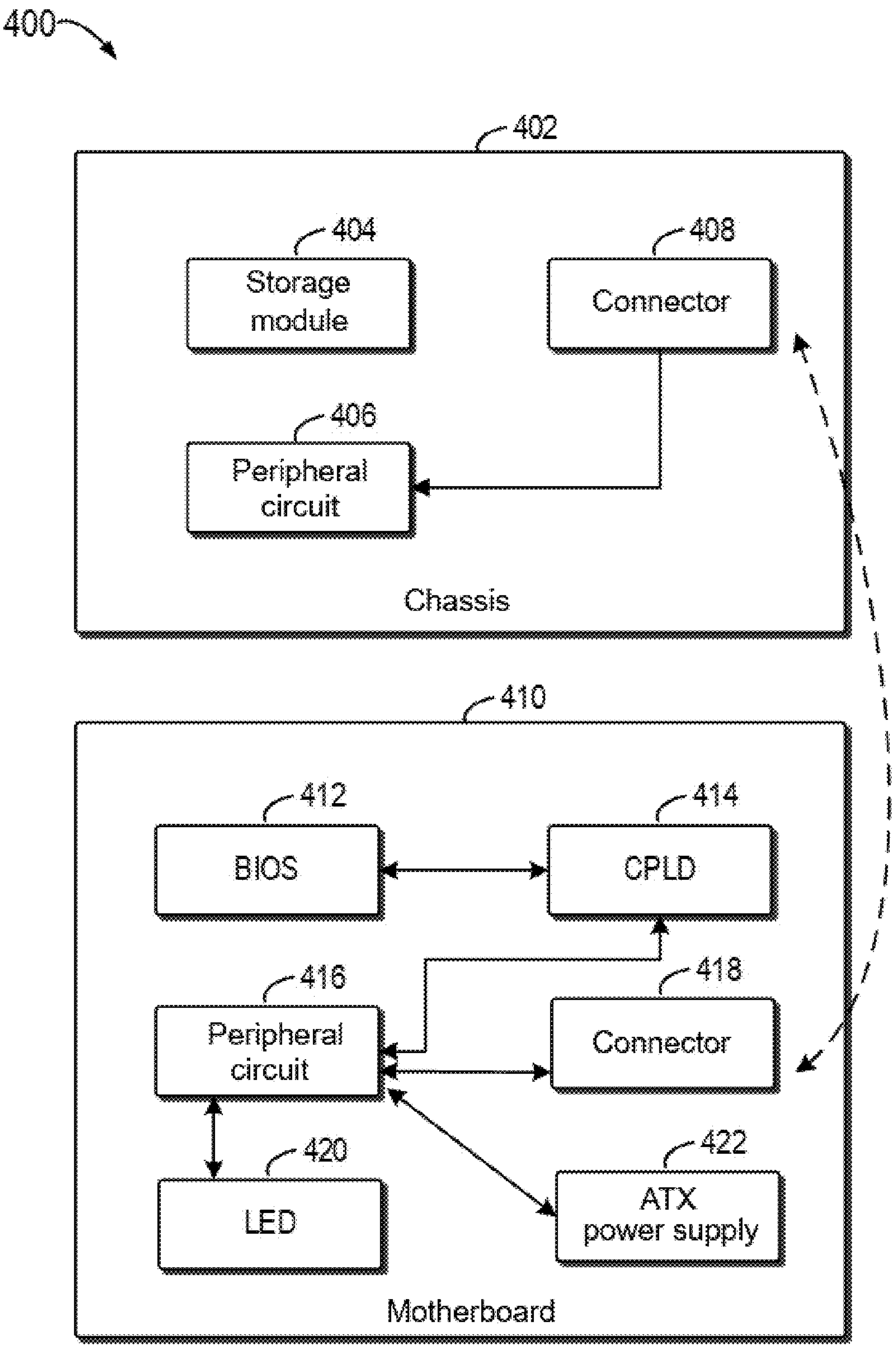
FIG. 4 is a first schematic diagram of a connection between a storage module and a motherboard according to some embodiments of the present disclosure.

FIG. 4 is a first schematic diagram of a connection 400 between a storage module and a motherboard according to some embodiments of the present disclosure. As shown in FIG. 4, the storage module may be an EEPROM chip 404 arranged on the chassis 402, and the controller of the motherboard 410 (e.g., the component for determining that the chassis 402 is opened) may be a CPLD 414 of the motherboard. The EEPROM chip 404 and a peripheral circuit 406 can be connected with the CPLD 414 of the motherboard (also including a peripheral circuit 416 of the CPLD 414) via a connector 408 and a connector 418. When the chassis 402 is opened without authorization, the connection between the connector 408 and the connector 418 will be broken, and accordingly, the connection between the EEPROM chip 404 on the chassis 402 and the CPLD 414 on the motherboard 410 will also be broken. Thus, the EEPROM chip 404 on the chassis 402 cannot receive the sent verification information. When the CPLD 414 of the motherboard 410 determines that the chassis 402 is opened, a series of protection strategies can be implemented to respond to the threat or error. For example, when the CPLD 414 detects disconnection from the EEPROM chip 404 or finds an error or inconsistency when verifying the verification information stored in the EEPROM chip 404, it can trigger a preset protection mechanism immediately. This preset protection mechanism usually includes turning on an indicator light 420 (e.g., an LED) to provide a visual alert to tell the user or administrator that the system may have suffered an unauthorized access or some kind of failure. In addition to turning on the indicator light 420, the CPLD 414 can also cut off the power supply 422 (e.g., an ATX power supply) of the system. By cutting off the power supply 422 of the system, the CPLD 414 can ensure that the whole system is shut down immediately, thus preventing potential malicious activities or data corruption from further occurring.

In some embodiments of the present disclosure, in order to increase the security protection level of the device, the storage module may also be a Flash chip that can be connected with, for example, the controller of the motherboard via a communication bus. For example, the Flash chip can be connected with the BMC of the motherboard via a four-wire SPI bus, and the BMC generates and sends verification information to the Flash chip and determines whether the chassis is opened through the information read from the Flash chip.

In some embodiments of the present disclosure, the verification information generated by the BMC may include the serial number of the device, time stamp, and dynamic password. Among them, the dynamic password can be encrypted by the BMC through a hash algorithm and an encryption algorithm. By means of advanced encryption, the security features of the chassis intrusion detection mechanism can be improved. The controller of the motherboard can generate the verification information at preset time intervals, and can also read the information stored in the Flash chip at preset time intervals for verification. For example, the BMC can update the verification information by updating the time stamp every 20 s, and determine the integrity and connection state of the Flash chip by verifying the read stored information every 20 s.

Figure 5:
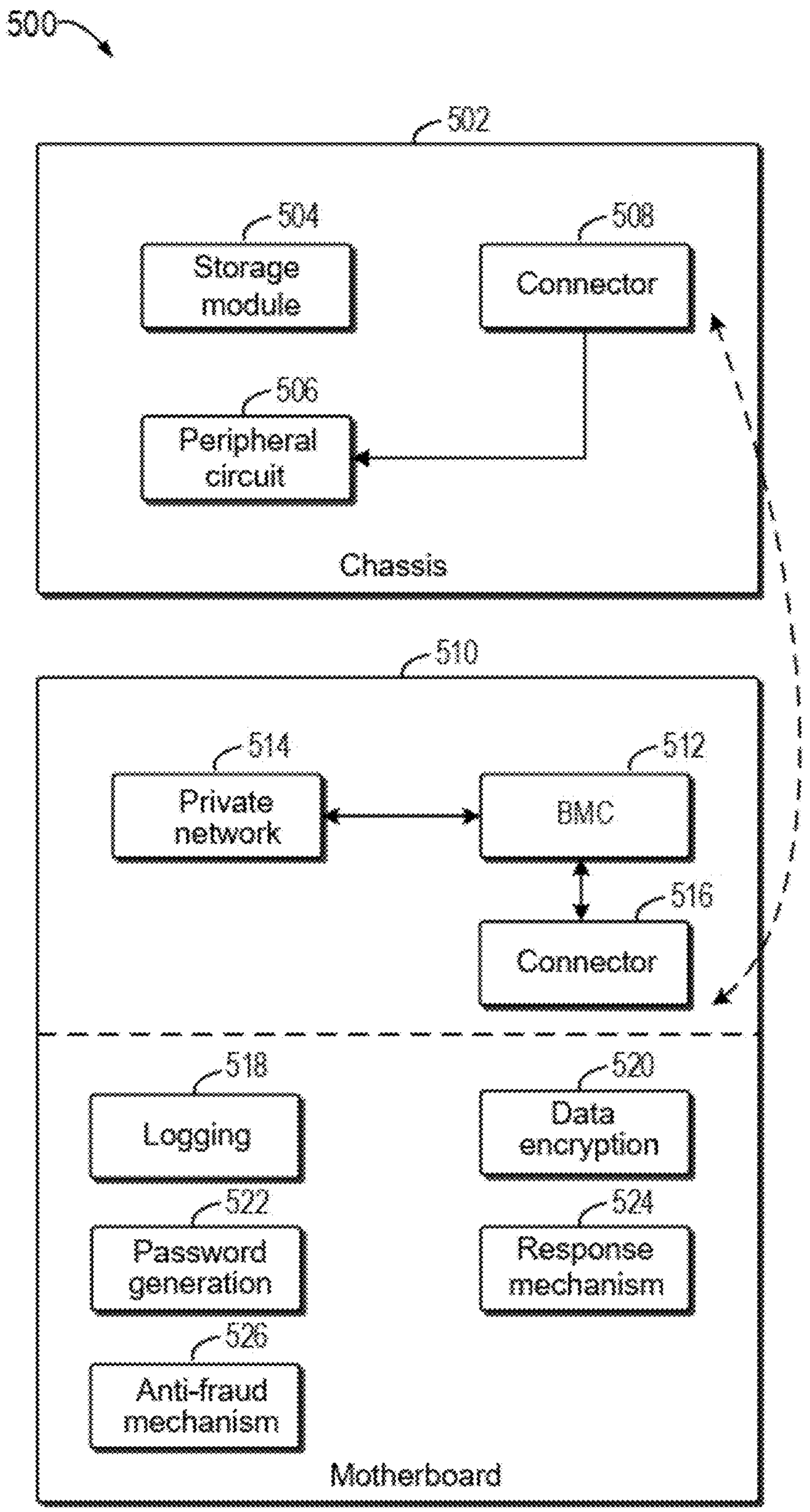
FIG. 5 is a second schematic diagram of a connection between a storage module and a motherboard according to some embodiments of the present disclosure.

FIG. 5 is a second schematic diagram of a connection 500 between a storage module and a motherboard according to some embodiments of the present disclosure. As shown in FIG. 5, the storage module arranged on the chassis 502 may be a Flash chip 504, and the controller of the motherboard 510 may be a BMC 512. Also included in the chassis 502 is a peripheral circuit 506 and connector 508 coupled to the peripheral circuit 506. The motherboard 510 further comprises an interface 514 of a private network, and a connector 516, both coupled to the BMC 512. The Flash chip 504 can communicate with the BMC 512 via a four-wire SPI bus, so as to realize data transmission and control. The serial number of the chassis, a time stamp, and a dynamic password can be stored in the Flash chip 504. In some embodiments of the present disclosure, the password can use the SHA-256 hash algorithm and a 128-bit AES key (or a 248-bit AES key, to enhance the compatibility and anti-quantum attack ability of the verification information) to generate a password 522 and encrypt 520 the password 522. In some embodiments of the present disclosure, the BMC 512 can update the verification information at preset time intervals (e.g., update the time stamp in the verification information, or write a random password to the last partition of the Flash chip 504 periodically and/or at other times), and send the updated verification information to the Flash chip 504, thus ensuring the timeliness and security of the verification information.

It can be understood that the BMC 512 can verify the accuracy of the information stored in the Flash chip 504 and the connection state between the Flash chip 504 and the BMC 512 at preset time intervals (e.g., every 20 s). If the verification information stored in the Flash chip 504 does not meet the expectation or the connection state between the Flash chip 504 and the BMC 512 is disconnected, it is determined that the chassis is opened. In some embodiments of the present disclosure, a timeout (trust duration) of 3 minutes can be set. If the verification fails multiple times within the specified period of time (3 minutes), it indicates that the chassis is opened. In this case, the BMC 512 can generate an instruction 524 for triggering a preset protection mechanism according to the verification situation.

In some embodiments of the present disclosure, the motherboard 510 can be configured to log the situation of each verification and generate a logging 518, which can log the verification results and the relevant parameters of the chassis intrusion. In some embodiments of the present disclosure, in order to prevent the verification information from being easily tampered with, verification can be made by means of an anti-fraud mechanism 526. For example, the verification information can be scrolled between the Flash chip 504 and the BMC 512 by means of frequency hopping.

In some embodiments of the present disclosure, when the storage module arranged on the chassis is connected with the controller of the motherboard via a bus, the wiring of the bus can cover the whole chassis cover or the whole chassis side panel. In this way, no matter how the malicious users open the cover, it is impossible to avoid cutting off part of the bus and breaking the communicative connection between the storage module and the controller of the motherboard.

Figure 6:
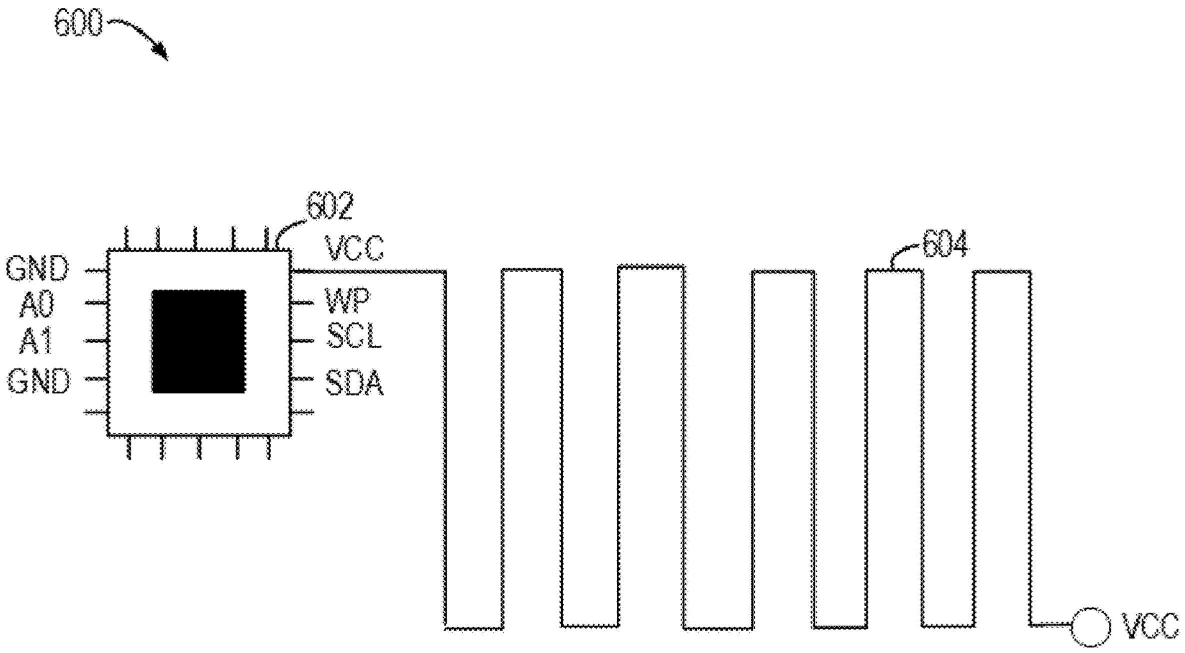
FIG. 6 is a schematic diagram of a wiring pattern of a bus according to some embodiments of the present disclosure.

FIG. 6 is a schematic diagram of a wiring pattern 600 of a bus according to some embodiments of the present disclosure. As shown in FIG. 6, a bus 604 can be distributed on the chassis (e.g., the chassis cover) in a serpentine wiring pattern, and accordingly, a storage module 602 can be arranged on the chassis cover. When determining the position to place the storage module 602, it is necessary to design the position to place the storage module in such a manner that, for example, the storage module is placed in a position that is not easy to be found and not easy to be targeted for intrusion, so as to effectively reduce the risk of intrusion. In some embodiments of the present disclosure, the VCC pin of the storage module can be connected with the VCC pin of the motherboard via the bus 604.

With such a complicated wiring pattern, even if an unauthorized user tries to bypass the wiring in a certain area, the communicative connection between the storage module and the motherboard controller will be cut off because the wiring in other areas is incomplete. For example, when someone tries to intrude by cutting the chassis cover, this operation will cut off the power supply or signal cable. The controller of the motherboard detects this interruption of connectivity and triggers an alarm as a protection response. This intrusion detection mechanism can quickly respond to the intrusion behavior and ensure the security of the system.

Figure 7:
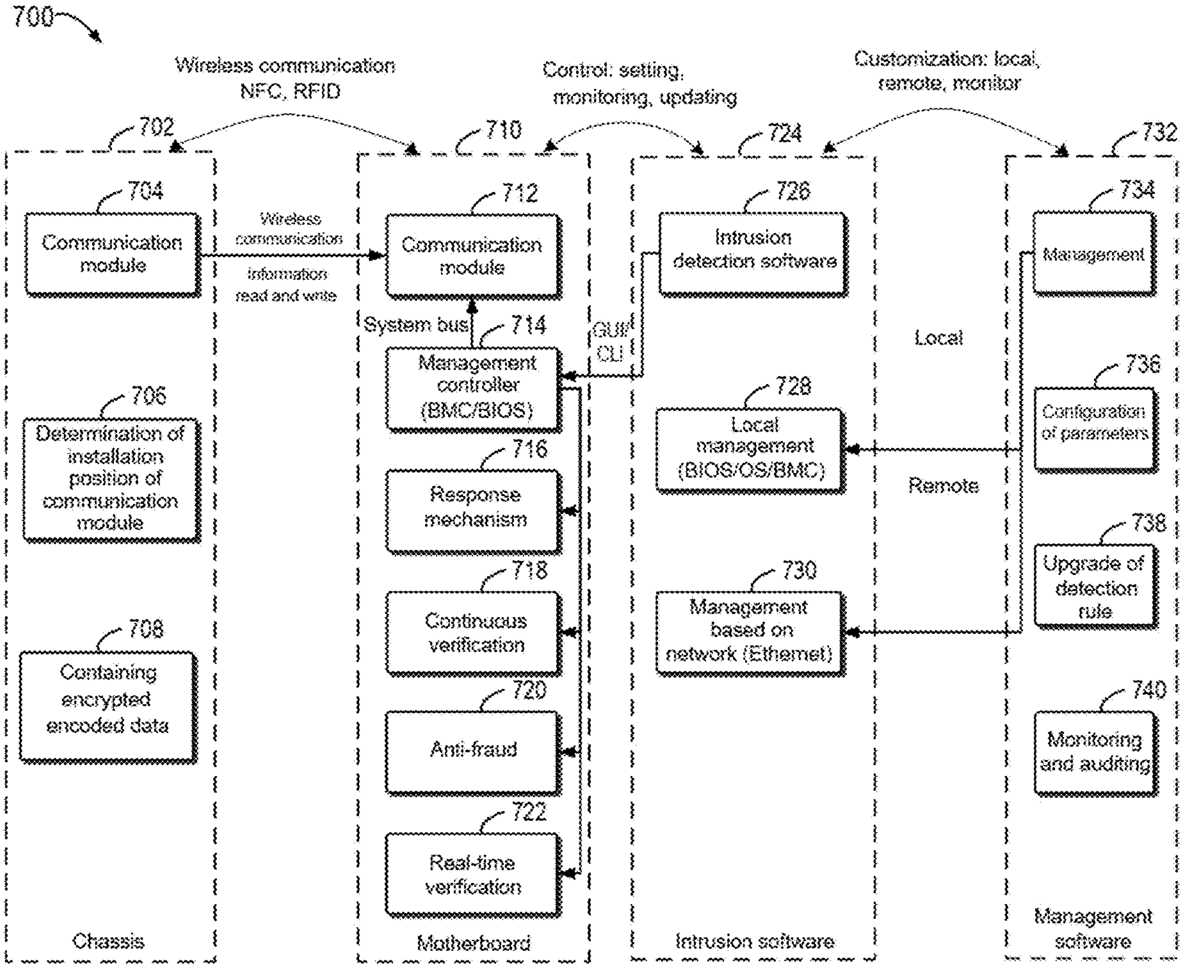
FIG. 7 is a schematic diagram of a system architecture for verifying that a chassis is opened according to some embodiments of the present disclosure.

FIG. 7 is a schematic diagram of a system architecture 700 for verifying that a chassis is opened according to some embodiments of the present disclosure. As shown in FIG. 7, a chassis 702 and a motherboard 710 can be communicatively connected with each other through a communication module 704 and a communication module 712. For example, a secure communicative connection between the chassis 702 and the motherboard 710 can be realized by using wireless communication technologies such as NFC and RFID, for example. The motherboard 710 reads the information from the communication module 704 and can also write information (e.g., write the generated verification information) into the communication module 704 through the communication module 712. In some embodiments of the present disclosure, the communication module 712 is connected with the management controller 714 of the motherboard 710, and the management controller 714 verifies whether the chassis 702 is opened based on the read information. The management controller 714 may be a local controller, such as BMC, BIOS, or the like, of the motherboard 710. The management controller 714 can be connected with the communication module 712 via a system bus, and the communication module 712 is controlled by the management controller 714.

It can be understood that at block 706, in order to improve the accuracy and security of intrusion detection, the installation positions of the communication modules 704 and the number of communication modules 704 installed can be determined based on the size of the chassis and the protection requirement of the device. For example, one communication module 704 is installed respectively at the middle of the left and right side panels and the upper cover of the chassis. Verification information 708 may be information containing encrypted encoded data. For example, the verification information 708 may be encrypted encoded data containing cross-chassis binding to containing cross-chassis binding to internal system uniqueness. In an example, the verification information=service tag+time stamp+password (e.g., MD5 encoding).

It can be understood that the management controller 714 can select different verification methods and verification strategies according to the protection requirements of the electronic device or other factors. For example, the management controller 714 can continuously verify 718 whether the chassis is opened. The management controller 714 can continuously read the information stored in the communication module 704 for a long period of time to verify whether the chassis is opened. In some embodiments of the present disclosure, in order to improve the reliability and security of the intrusion detection system, verification information can be generated in real time to verify 722 in real time whether the chassis is opened, so as to prevent users from easily acquiring the verification information and bypassing the intrusion detection. In some other embodiments of the present disclosure, an anti-fraud mechanism 720 can also be adopted to improve the reliability of the intrusion detection. For example, the verification information is scrolled between the communication module 712 and the communication module 704 by using frequency hopping, to prevent the verification information from being maliciously tampered with by users. In other embodiments, a program integrity self-check can also be performed to prevent the verification information from being tampered with.

At block 716, in the case where the chassis is verified to be opened, the management controller 714 can trigger a preset protection mechanism, such as powering off the system or alerting the user that the chassis is opened by flashing the indicator light. In some embodiments of the present disclosure, the intrusion detection software 726 may include local intrusion detection software (e.g., BIOS-embedded tool, operating system-based tool, BMC-based remote management utility) or remote intrusion detection software. The management controller 714 not only has local intrusion detection capability, but also supports remote management. For example, through the remote intrusion detection software, an administrator can remotely monitor the intrusion detection state of the chassis and adjust relevant parameters in real time. It can be understood that by means of the Graphical User Interface (GUI), the administrator can intuitively view the state and parameter settings of the intrusion detection, thus reducing the difficulty and complexity of operations.

As shown in FIG. 7, in order to change the strategy of the intrusion detection or the protection mechanism of the device according to the specific situation, the intrusion detection software can be configured or updated by management software 732, which implements functionality for local and remote management 734. It can be understood that intrusion software 724 may be arranged in the motherboard 710. The system supports the customization of local and remote management, monitoring, and updating functions to meet the requirements of different users. At block 728, the management of the intrusion detection software can be performed locally. At block 730, the intrusion detection software 726 can also be managed remotely through a network, for example, through Ethernet.

It can be understood that the management software 732 can configure 736 relevant parameters of the intrusion detection, for example, configuring the update frequency of the verification information, or configuring the generation mode of the verification information, or configuring the protection function, and remotely adjust the alarm according to the maintenance. The management software 732 can also upgrade 738 an intrusion detection rule, for example, setting the encryption method of the verification information or setting a trust duration. In some embodiments of the present disclosure, the management software 732 may also be cluster-based management software. For example, the management software 732 can perform centralized management and monitoring 740 on a plurality of chassis. In other words, the system supports cluster management, which can be easily extended to centralized management and monitoring of a large number of chassis. In some embodiments of the present disclosure, when the management software 732 remotely monitors that one or more chassis in the cluster have multiple insecurity factors, such as password leakage, the intrusion detection mechanism being cracked, or the like, in order to prevent other chassis from being intruded due to similar problems and causing serious losses to the user, the intrusion detection mechanisms of the chassis in the cluster can be upgraded or updated centrally. For example, the generation method of verification information in the intrusion detection mechanism of all the chassis is changed.

It can be understood that the various detection mechanisms (e.g., real-time verification and anti-fraud mechanism) are not contradictory to each other, and the user can select a plurality of detection methods and any suitable combination thereof according to his/her own demands, thus improving the accuracy and reliability of the intrusion detection. It should be noted that the modules shown in FIG. 7 are not specific limitations, but are just examples. For example, the management controller may be not only BMC and BIOS, but also other types of management controllers.

In this way, by combining the response of the motherboard controller, the network communication, and the analysis and processing capabilities of the management software, an efficient and secure intrusion detection system can be constructed, and the security of the device and system can be effectively protected by using various protection mechanisms.

Figure 8:
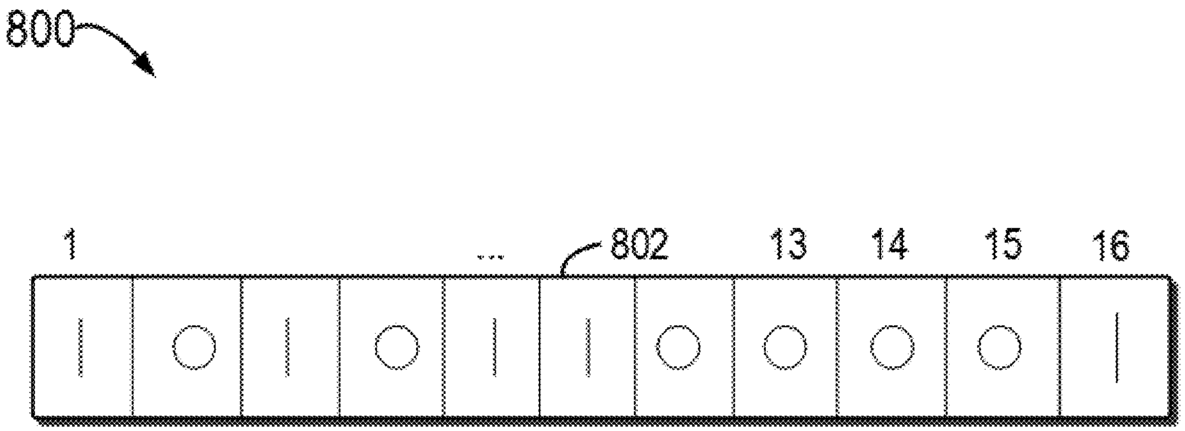
FIG. 8 is a schematic diagram of a storage mode of verification information according to some embodiments of the present disclosure.

FIG. 8 is a schematic diagram of a storage mode 800 of verification information according to some embodiments of the present disclosure. As shown in FIG. 8, a CPLD module 802 can contain 64-bit storage space, of which 16-bit storage space can be used to store dynamic passwords (e.g., to store dynamic code sequences). In some embodiments of the present disclosure, a 16-bit Linear Feedback Shift Register (LFSR) is built in the CPLD. The LSFR can generate a 16-bit pseudo-random code periodically (e.g., every 60 seconds) and/or at other times to update the last 16 bits of the dynamic password.

Figure 9:
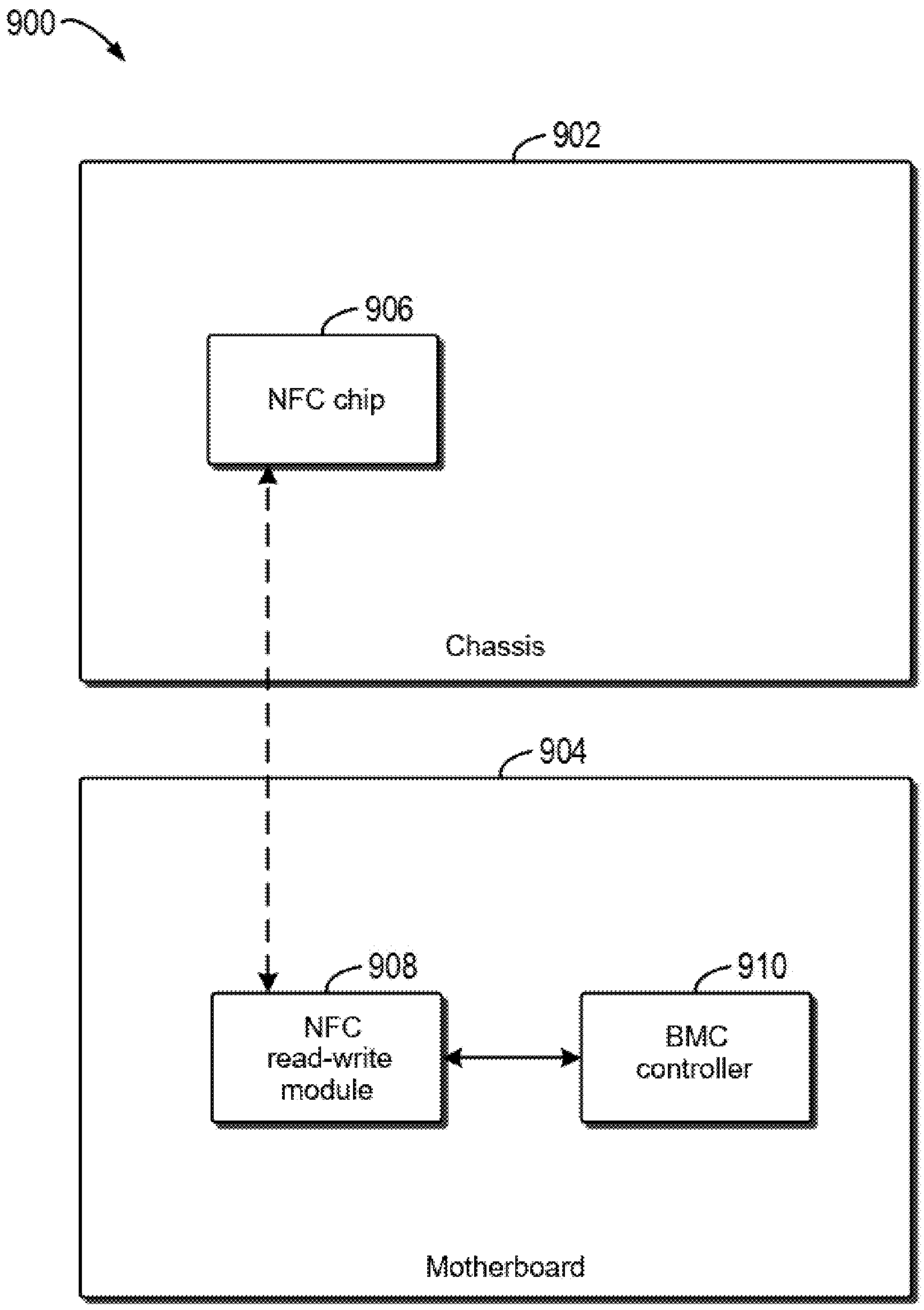
FIG. 9 is a schematic diagram of a wireless connection between a chassis and a motherboard according to some embodiments of the present disclosure.

FIG. 9 is a schematic diagram 900 of a wireless connection between a chassis and a motherboard according to some embodiments of the present disclosure. As shown in FIG. 9, the chassis 902 is communicatively connected with the motherboard 904 through an NFC chip 906 and an NFC read-write module 908. The NFC chip 906 can be arranged on both sides of the chassis bottom. The NFC chip 906 can be used to generate verification information based on the serial number of the chassis or by other means. The NFC read-write module 908 can be connected with the BMC controller 910 through a network or by other means. In some embodiments of the present disclosure, a communication session can be automatically established between the NFC read-write module 908 and the NFC chip 906 periodically (e.g., every 5 seconds) and/or at other times for verifying the verification information in the NFC chip 906.

As can be understood, it can be determined that the chassis is opened if the NFC read-write module 908 undergoes consecutive communication verification failures or the verification of verification information fails within a preset duration (e.g., 10 seconds). The NFC read-write module 908 can send verification failure information to the BMC controller, thereby triggering a preset protection mechanism. In other words, in some embodiments of the present disclosure, the verification of whether the chassis is opened can be performed by the NFC read-write module 908. It can be understood that other types of read-write modules can be used instead of the NFC read-write module 908, and the type of the read-write model is not specifically limited.

Figure 10:
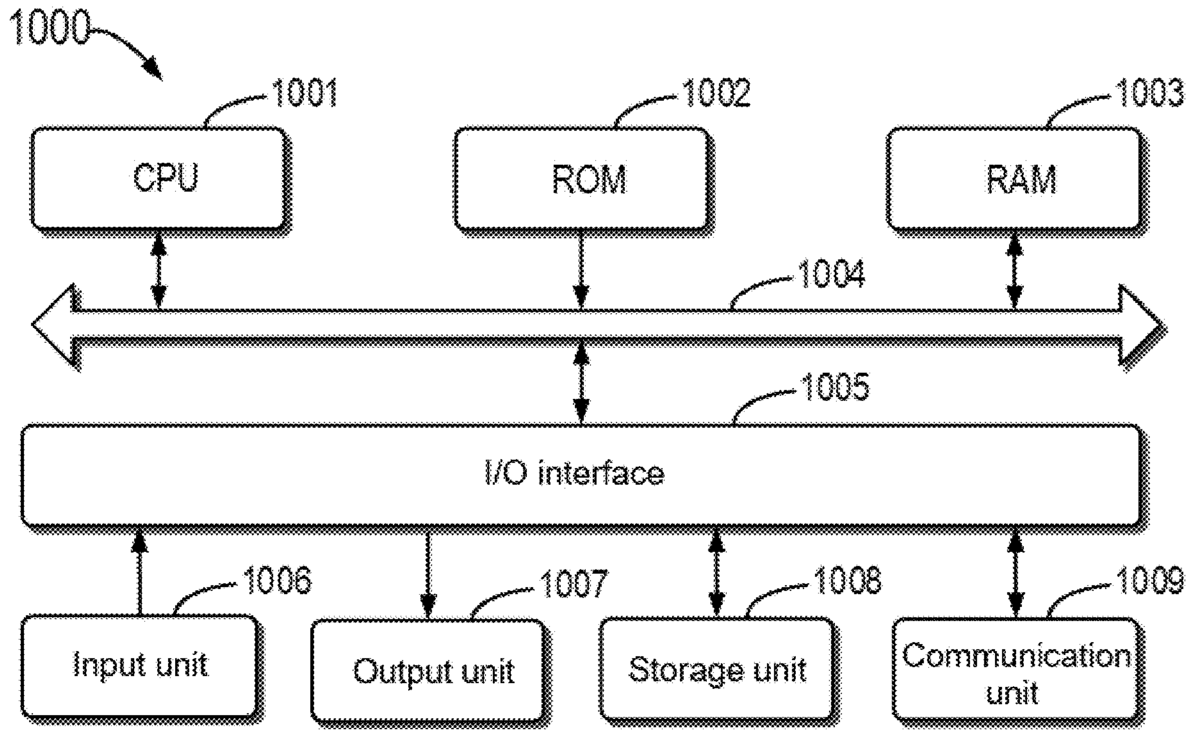
FIG. 10 is a block diagram of an example device that can be used to implement embodiments of the present disclosure.

FIG. 10 is a block diagram of an example device 1000 that can be used to implement embodiments of the present disclosure. The electronic device in FIG. 1 can be implemented by using the device 1000. As shown in the figure, the device 1000 includes a central processing unit (CPU) 1001 that can perform various appropriate actions and processing according to computer program instructions stored in a read-only memory (ROM) 1002 or computer program instructions loaded from a storage unit 1008 to a random access memory (RAM) 1003. Various programs and data needed for the operation of the device 1000 may also be stored in the RAM 1003. The CPU 1001, the ROM 1002, and the RAM 1003 are connected to each other via a bus 1004. An Input/Output (I/O) interface 1005 is also connected to the bus 1004.

A plurality of components in the device 1000 are connected to the I/O interface 1005, including: an input unit 1006, such as a keyboard and a mouse; an output unit 1007, such as various types of displays and speakers; a storage unit 1008, such as a magnetic disk and an optical disc; and a communication unit 1009, such as a network card, a modem, and a wireless communication transceiver. The communication unit 1009 allows the device 1000 to exchange information/data with other devices via a computer network, such as the Internet, and/or various telecommunication networks.

The various processes and processing described above, such as the method 300, can be performed by the CPU 1001. For example, in some embodiments, the method 300 may be implemented as a computer software program that is tangibly included in a machine-readable medium, such as the storage unit 1008. In some embodiments, part or all of the computer program may be loaded and/or installed onto the device 1000 via the ROM 1002 and/or the communication unit 1009. When the computer program is loaded onto the RAM 1003 and executed by the CPU 1001, one or more actions of the method 300 described above can be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can maintain and store instructions to be used by an instruction execution device. For example, the computer-readable storage medium may be, but is not limited to, an electric storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device through a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in various computing/processing devices.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of network, including a local area network (LAN) or a wide area network (WAN), or may be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, apparatus (system), and computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flow charts and/or block diagrams. These computer-readable program instructions may also be stored in a computer-readable storage medium, and cause a computer, a programmable data processing apparatus, and/or other devices to function in a particular manner, so that the computer-readable medium having the instructions stored thereon includes an article of manufacture including instructions for implementing various aspects of the functions/acts specified in one or more blocks in the flow charts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions annotated in the blocks may also occur in a sequence different from the sequence annotated in the drawings. For example, two successive blocks may actually be executed in parallel substantially, and sometimes they may also be executed in a reverse order, which depends on the functions involved. It should be further noted that each block in the block diagrams and/or flow charts as well as a combination of blocks in the block diagrams and/or flow charts may be implemented using a dedicated hardware-based system that executes specified functions or actions, or using a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for verifying that a chassis is opened, the chassis being communicatively connected with a controller of a motherboard, the method comprising:

sending first verification information to the chassis, wherein the first verification information comprises at least a time stamp and a password; and determining that the chassis is opened in response to not receiving second verification information sent by the chassis within a preset time period; or determining that the chassis is opened in response to the second verification information sent by the chassis, as received, being different from the first verification information, wherein determining that the chassis is opened in response to the second verification information being different from the first verification information comprises at least one of (i) determining that the second verification information is different from the first verification information based on a time stamp contained in the second verification information and/or (ii) determining that the second verification information is different from the first verification information based on a password contained in the second verification information;

the method further comprising:

based on determining that the chassis is opened, determining an intrusion type of an intrusion into the chassis; and based on the intrusion type, executing a preset protection mechanism corresponding to the intrusion type and returning exception reminder information.

2. The method according to claim 1, wherein a communicative connection is established between the chassis and the motherboard through a first wireless communication module arranged on the chassis and a second wireless communication module arranged on the motherboard, and sending first verification information to the chassis comprises:

sending the first verification information to the chassis through the first wireless communication module and the second wireless communication module.

3. The method according to claim 2, further comprising:

determining a size, installation position, and power supply of the first wireless communication module based on a size of the chassis.

4. The method according to claim 1, wherein a communicative connection is established between the chassis and the motherboard through a storage module arranged on the chassis, the storage module is connected with the controller of the motherboard via a bus, and sending first verification information to the chassis comprises:

sending the first verification information to the storage module on the chassis via the bus, the first verification information being stored by the storage module.

5. The method according to claim 1, wherein sending first verification information to the chassis comprises:

determining a preset time interval based on at least one of a protection requirement of an electronic device and a protection requirement corresponding to the motherboard; and generating the first verification information and sending it to the chassis at the preset time interval.

6. The method according to claim 5, further comprising:

generating updated first verification information at the preset time interval in response to the second verification information being the same as the first verification information; and by sending the updated first verification information to the chassis, updating the second verification information according to the updated first verification information by using the chassis.

7. The method according to claim 6, wherein determining that the chassis is opened comprises:

determining that the chassis is opened in response to not receiving the updated second verification information sent by the chassis within the preset time period; or, determining that the chassis is opened in response to the updated second verification information sent by the chassis that is received within the preset time period being different from the updated first verification information.

8. The method according to claim 1, wherein executing a preset protection mechanism corresponding to the intrusion type comprises:

powering off the chassis and returning the exception reminder information in response to a risk level included in the intrusion type being greater than a preset level.

9. The method according to claim 1, further comprising:

configuring a generation mode of the first verification information and/or the preset protection mechanism according to configuration parameters input by a user based on a remote mode.

10. The method according to claim 1, wherein the first verification information further comprises a device serial number.

11. An electronic device, comprising:

a chassis;

a motherboard installed in the chassis and comprising a controller communicatively connected with the chassis; and memory coupled to the controller of the motherboard and having instructions stored therein, wherein the instructions, when executed by the controller of the motherboard, cause the electronic device to perform actions comprising:

sending first verification information to the chassis, wherein the first verification information comprises at least a time stamp and a password; and determining that the chassis is opened in response to not receiving second verification information sent by the chassis within a preset time period; or determining that the chassis is opened in response to the second verification information sent by the chassis, as received, being different from the first verification information, wherein determining that the chassis is opened in response to the second verification information being different from the first verification information comprises at least one of (i) determining that the second verification information is different from the first verification information based on a time stamp contained in the second verification information and/or (ii) determining that the second verification information is different from the first verification information based on a password contained in the second verification information;

the actions further comprising:

based on determining that the chassis is opened, determining an intrusion type of an intrusion into the chassis; and based on the intrusion type, executing a preset protection mechanism corresponding to the intrusion type and returning exception reminder information.

12. The electronic device according to claim 11, wherein a communicative connection is established between the chassis and the motherboard through a first wireless communication module arranged on the chassis and a second wireless communication module arranged on the motherboard, and sending first verification information to the chassis comprises:

sending the first verification information to the chassis through the first wireless communication module and the second wireless communication module.

13. The electronic device according to claim 11, wherein a communicative connection is established between the chassis and the motherboard through a storage module arranged on the chassis, the storage module is connected with the controller via a bus, and sending first verification information to the chassis comprises:

sending the first verification information to the storage module on the chassis via the bus, the first verification information being stored by the storage module.

14. The electronic device according to claim 11, wherein sending first verification information to the chassis comprises:

determining a preset time interval based on at least one of a protection requirement of the electronic device and a protection requirement corresponding to the motherboard; and generating the first verification information and sending it to the chassis at the preset time interval.

15. The electronic device according to claim 14, wherein the actions further comprise:

generating updated first verification information at the preset time interval in response to the second verification information being the same as the first verification information; and by sending the updated first verification information to the chassis, updating the second verification information according to the updated first verification information by using the chassis.

16. The electronic device according to claim 15, wherein determining that the chassis is opened comprises:

determining that the chassis is opened in response to not receiving the updated second verification information sent by the chassis within the preset time period; or, determining that the chassis is opened in response to the updated second verification information sent by the chassis that is received within the preset time period being different from the updated first verification information.

17. A computer program product comprising a non-transitory computer-readable storage medium having machine-executable instructions stored therein, the machine-executable instructions, when executed by a machine, causing the machine to perform actions comprising:

sending first verification information to a chassis, wherein the first verification information comprises at least a time stamp and a password; and determining that the chassis is opened in response to not receiving second verification information sent by the chassis within a preset time period; or determining that the chassis is opened in response to the second verification information sent by the chassis, as received, being different from the first verification information, wherein determining that the chassis is opened in response to the second verification information being different from the first verification information comprises at least one of (i) determining that the second verification information is different from the first verification information based on a time stamp contained in the second verification information and/or (ii) determining that the second verification information is different from the first verification information based on a password contained in the second verification information;

the actions further comprising:

based on determining that the chassis is opened, determining an intrusion type of an intrusion into the chassis; and based on the intrusion type, executing a preset protection mechanism corresponding to the intrusion type and returning exception reminder information.

18. The computer program product according to claim 17, wherein a communicative connection is established between the chassis and a motherboard through a first wireless communication module arranged on the chassis and a second wireless communication module arranged on the motherboard, and sending first verification information to the chassis comprises:

sending the first verification information to the chassis through the first wireless communication module and the second wireless communication module.

19. The computer program product according to claim 17, wherein executing a preset protection mechanism corresponding to the intrusion type comprises:

powering off the chassis and returning the exception reminder information in response to a risk level included in the intrusion type being greater than a preset level.

20. The computer program product according to claim 17, wherein the actions further comprise:

configuring a generation mode of the first verification information and/or the preset protection mechanism according to configuration parameters input by a user based on a remote mode.

* * * * *